(12) United States Patent  (10) Patent No.: US 7,681,209 B2
Kurita  (45) Date of Patent: Mar. 16, 2010

(54) OPTICAL DISK PLAYER

(75) Inventor: Takeshi Kurita, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 570 days.

(21) Appl. No.: 11/727,184

(22) Filed: Mar. 23, 2007

(65) Prior Publication Data
US 2008/0263575 A1 Oct. 23, 2008

(30) Foreign Application Priority Data
Mar. 29, 2006 (JP) ............................. 2006-092168

(51) Int. Cl.
G11B 21/02 (2006.01)
(52) U.S. Cl. ..................................... 720/607
(58) Field of Classification Search ................ 720/607, 720/659; 369/215.1; 74/89.17, 409
See application file for complete search history.

(56) References Cited

U.S. PATENT DOCUMENTS 5,119,357 A * 6/1992 Tsuruta et al. .............. 720/608
7,047,540 B2 * 5/2006 Hoch ......................... 720/659
2004/0103731 A1 * 6/2004 Minowa et al. ............ 74/89.11

FOREIGN PATENT DOCUMENTS

JP       3-14779 U       2/1991
JP       2005-50456 A    2/2005
JP       2005-228456 A   8/2005

OTHER PUBLICATIONS

Japanese Office Action dated Aug. 26, 2008 with English translation (Four (4) pages).

* cited by examiner

Primary Examiner—Angel A. Castro
(74) Attorney, Agent, or Firm—Crowell & Moring LLP

(57) ABSTRACT

An optical disk player comprises a rack which holds an optical pickup unit and moves with rotation of a pinion. The rack includes a fixed rack plate, which is fixed to the optical pickup unit, and a movable rack plate, which can slide in a moving direction of the fixed rack plate, and projecting members on the fixed rack plate are inserted into guide slots in the movable rack plate. A projecting portion which includes a resin spring is provided on the movable rack plate. When the projecting portion presses a supporter on the fixed rack plate, inner surfaces of the guide slots are pressed against the projecting members by a repulsive force of the projecting portion, and a shaky movement between the movable rack plate and the fixed rack plate is avoided, thus a clatter can be reduced when the rack moves with rotation of the pinion.

6 Claims, 6 Drawing Sheets

OPTICAL DISK PLAYER

BACKGROUND OF THE INVENTION

1. Field of the Invention

The present invention relates to an optical disk player which records and reproduces data in optical disks such as CD, DVD, and so on, for example.

2. Description of the Related Art

A conventional optical disk player records and reproduces data in an optical disk by irradiating a light, which is output from an optical pickup unit, on the optical disk with rotating the optical disk by a disk drive unit. The optical pickup unit has a light emitting device, a light receiving device, and so on in a case, so that it outputs a light, which is emitted from the light emitting device, from a light hole formed on the case and also receives a light, which enters from the light hole, by the light receiving device. The optical pickup unit is held in a rack which moves with rotation of a pinion, and moves in a radial direction of the optical disk (that is, a seek operation is performed) with the rack according to the movement of the rack caused by the rotation of the pinion by a driving force of a motor.

In this type of the optical disk player, a double rack having two rack plates which overlap each other is applied as the rack to improve feed accuracy of the optical pickup unit, so that a backlash between the pinion and the rack is prevented. As the double rack, a composition shown in FIGS. 5A and 5B and FIGS. 6A, 6B, and 6C is well known.

A rack 100 in FIGS. 5A and 5B and FIGS. 6A, 6B, and 6C comprises two rack plates, that is, a fixed rack plate 101 and a movable rack plate 102. The fixed rack plate 101 is formed to be integral with a case 104 of an optical pickup unit 103 and is supported by guide members, that is, a guide bar 105 and a guide rail 106 to be movable in a tooth row direction of the fixed rack plate 101. The movable rack plate 102 is mounted on a top of the fixed rack plate 101 so as to be able to slide in a moving direction of the fixed rack plate 101. The optical pickup unit 103 outputs and lets in a light from a light hole 107 which is provided in an upper surface of the case 104.

On the fixed rack plate 101, projecting members 111, 112, and 113, which project from an upper surface of the fixed rack plate 101, are disposed along the moving direction of the fixed rack plate 101, and in contrast, in the movable rack plate 102, guide slots 121, 122, and 123 are disposed along a tooth row direction of the fixed rack plate 102. The projecting members 111, 112, and 113 on the fixed rack plate 101 are slidably inserted into the guide slots 121, 122, and 123 in the movable rack plate 102, and thus, the movable rack plate 102 is mounted to be able to slide in the moving direction of the fixed rack plate 101.

On the fixed rack plate 101, a locking portion 115, which projects from a side surface of a supporter 114 provided on the upper surface of the fixed rack plate 101, is provided, and in contrast, on the movable rack plate 102, a projecting portion 124, which projects from a side surface of the movable rack plate 102, is provided. The locking portion 115 on the fixed rack plate 101 is located above the projecting portion 124 on the movable rack plate 102 and also locks slidably the projecting portion 124, so that the movable rack plate 102 is held not to be detached from the fixed rack plate 101.

On the movable rack plate 102, a projecting member 125, which projects from an upper surface of the movable rack plate 102, is formed, and a spring 130 is provided between the projecting member 112 on the fixed rack plate 101 and the projecting member 125 on the movable rack plate 102. The fixed rack plate 101 and the movable rack plate 102 are engaged with a pinion 140 with compressing the spring 130 between the projecting members 112 and 125 (refer to FIGS. 6A, 6B, and 6C).

In the rack 100 having the composition described above, stretching force of the spring 130 allows teeth of the fixed rack plate 101 and teeth of the movable rack plate 102 to hold teeth of the pinion 140 tightly, thus the backlash between the rack 100 and the pinion 140 is prevented, and the feed accuracy of the optical pickup unit 103 is improved.

However, in the conventional optical disk player described above, the projecting members 111, 112, and 113 on the fixed rack plate 101 are slidably inserted into the guide slots 121, 122, and 123 in the movable rack plate 102, so that there are clearances between the projecting members 111, 112, and 113 and inner surfaces of the guide slots 121, 122, and 123 and between the supporter 114 and the projecting portion 124. Consequently, when the rack 100 moves with the rotation of the pinion 140, the movable rack plate 102 shakes in a horizontal direction (in a direction perpendicular to the moving direction of the rack 100) by the driving force of the pinion 140, and the inner surfaces of the guide slots 121, 122, and 123 hit the projecting members 111, 112, and 113, or the projecting portion 124 hits the supporter 114, thus a clatter occurs. This clatter is offensive to the ear.

SUMMARY OF THE INVENTION

The present invention is to solve the problem described above, and an object of the present invention is to provide an optical disk player which can reduce clatter caused by a movable rack plate hitting a fixed rack plate when a rack moves with rotation of a pinion.

According to an aspect of the present invention, the object described above is achieved by the optical disk player which comprises an optical pickup unit which outputs a light to record and read data on and from an optical disk, a pinion which is rotated by a driving force of a motor, and a rack which holds the optical pickup unit and is also engaged with the pinion and moved with rotation of the pinion, wherein the rack is a double rack which includes a fixed rack plate, which is movably supported by guide members and is fixed to the optical pickup unit, and a movable rack plate, which overlaps the fixed rack plate slidably in a direction parallel to a moving direction of the fixed rack plate so that a backlash between the rack and the pinion is prevented.

The optical disk player further comprises a press member which presses the movable rack plate against the fixed rack plate in a horizontal direction perpendicular to a slide direction of the movable rack plate.

The optical disk player can avoid a shaky movement between the movable rack plate and the fixed rack plate in the horizontal direction by pressing the movable rack plate against the fixed rack plate by using the press member. Thus, the optical disk player can prevent the movable rack plate from hitting the fixed rack plate when the rack moves with rotation of the pinion, so that the optical disk player can reduce a sound caused by the movable rack plate hitting the fixed rack plate (referred to as a clatter, hereinafter) and a noise of the clatter can be suppressed.

Preferably, a locking portion, which is formed by extending a supporter on an upper surface of the fixed rack plate, is provided on the fixed rack plate so that the movable rack plate is not detached from the fixed rack plate, and a projecting portion, which projects from a side surface of the movable rack plate and is slidably locked by the locking portion, is provided on the movable rack plate, and moreover, the projecting portion also functions as the press member, and the press member presses the movable rack plate against the fixed rack plate by using a repulsive force of the press member caused by pressing the supporter.

In this composition, the projecting portion, which prevents the movable rack plate from being detached from the fixed rack plate, also functions as the press member, and then avoids a shaky movement between the movable rack plate and the fixed rack plate in a horizontal direction by using the composition not to detach the movable rack plate from the fixed rack plate, thus the composition of the rack does not get complex but can be simplified and downsized.

More preferably, the press member has a resin spring made of a resin to be integral with the movable rack plate.

Projecting members, which project from an upper surface of the fixed rack plate, can be provided on the fixed rack plate so that the movable rack plate is slidably attached to the fixed rack plate, and guide slots, into which the projecting members are slidably inserted, can be provided on the movable rack plate.

While the novel features of the present invention are set forth in the appended claims, the present invention will be better understood from the following detailed description taken in conjunction with the drawings.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Embodiments of the present invention, as best mode for carrying out the invention, will be described hereinafter with reference to the drawings. The present invention relates to an optical disk player. It is to be understood that the embodiments described herein are not intended as limiting, or encompassing the entire scope of, the present invention.

Figure 1:
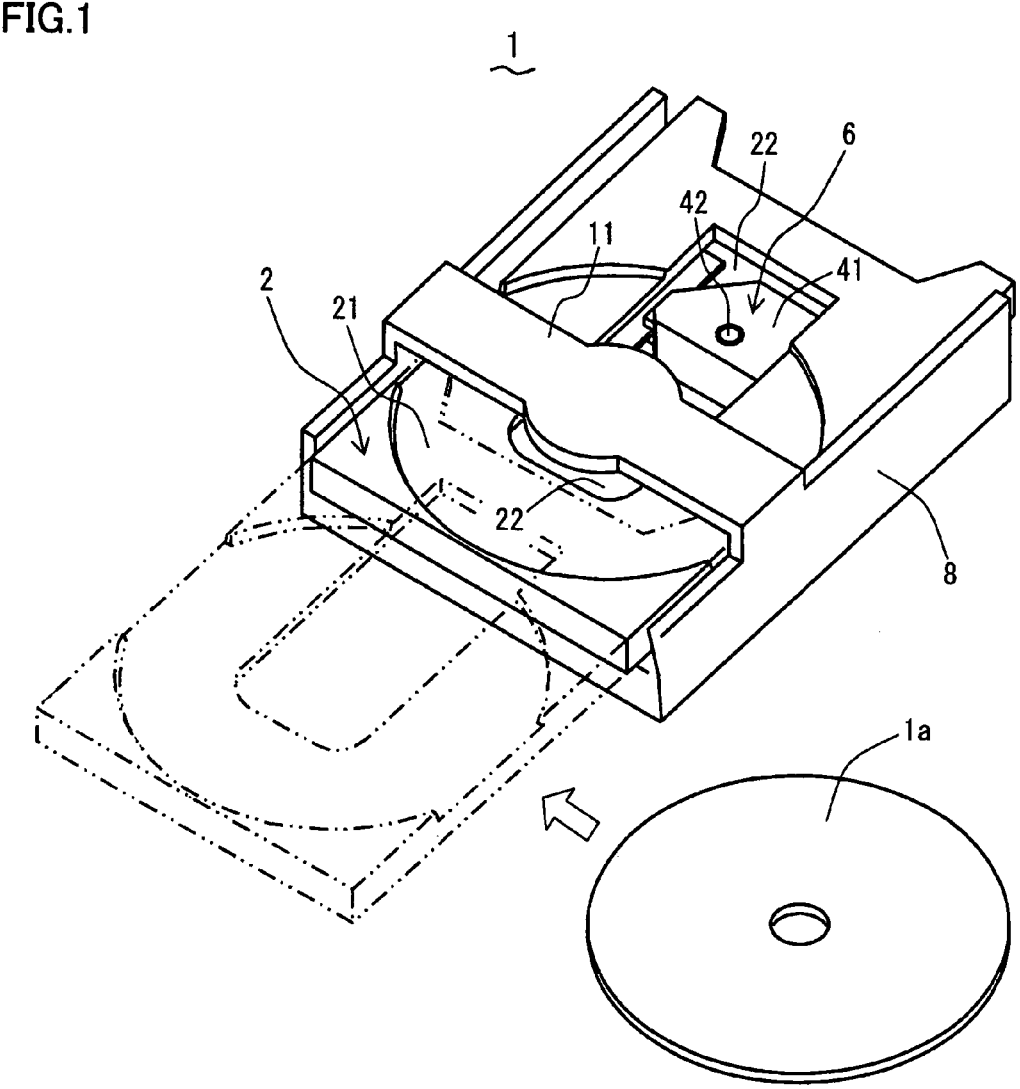
FIG. 1 is a perspective view illustrating a schematic composition of an optical disk player according to a preferred embodiment of the present invention.
Figure 2A:
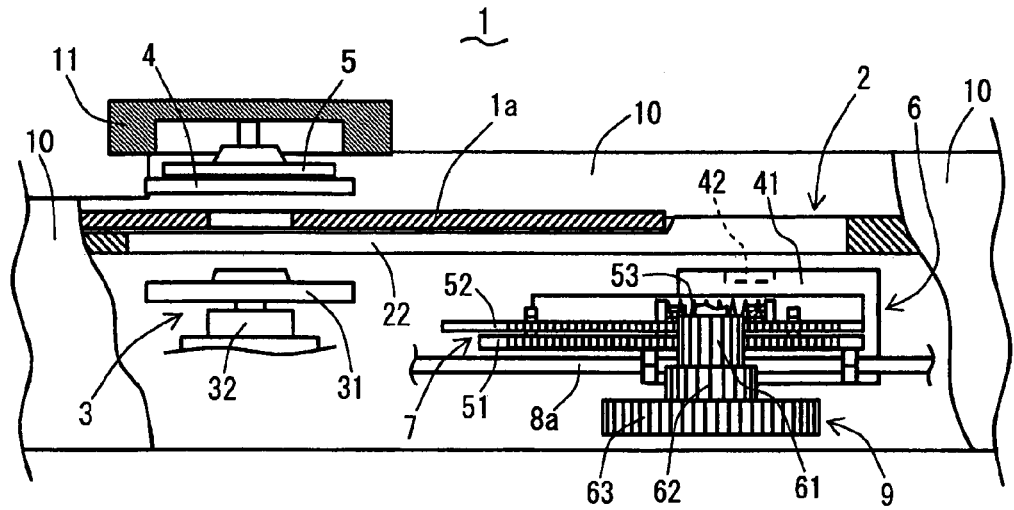
FIG. 2A is a cross sectional view of the optical disk player described in FIG. 1.
Figure 2B:
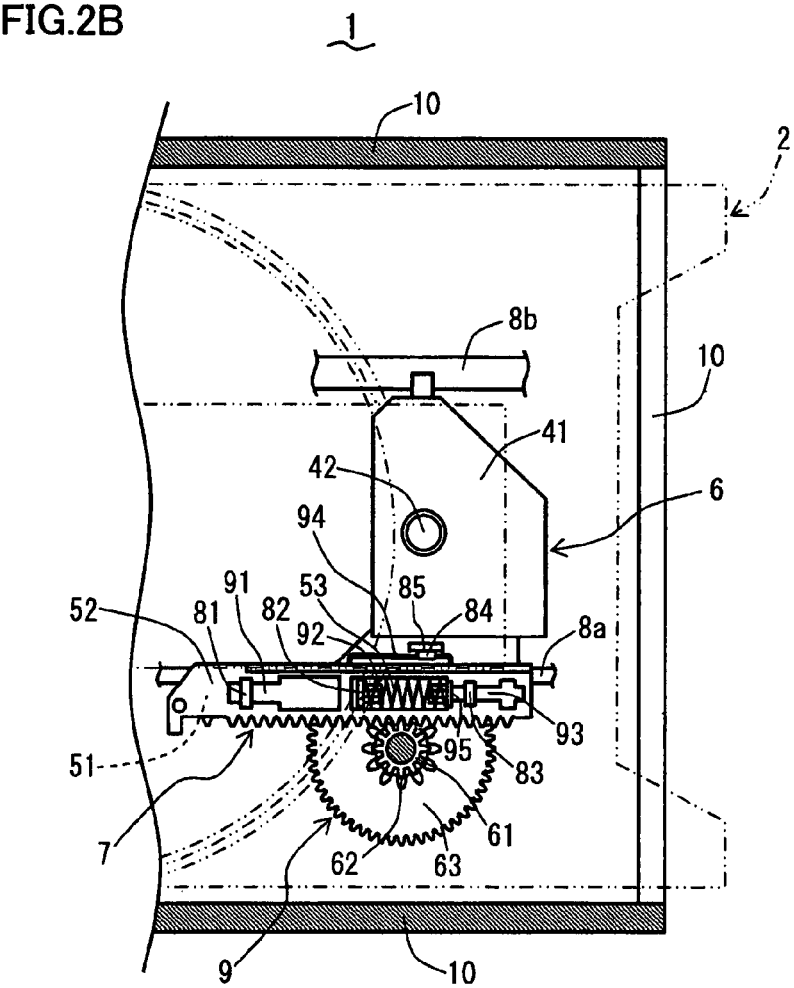
FIG. 2B is a plane view of the optical disk player described in FIG. 1.
Figure 3A:
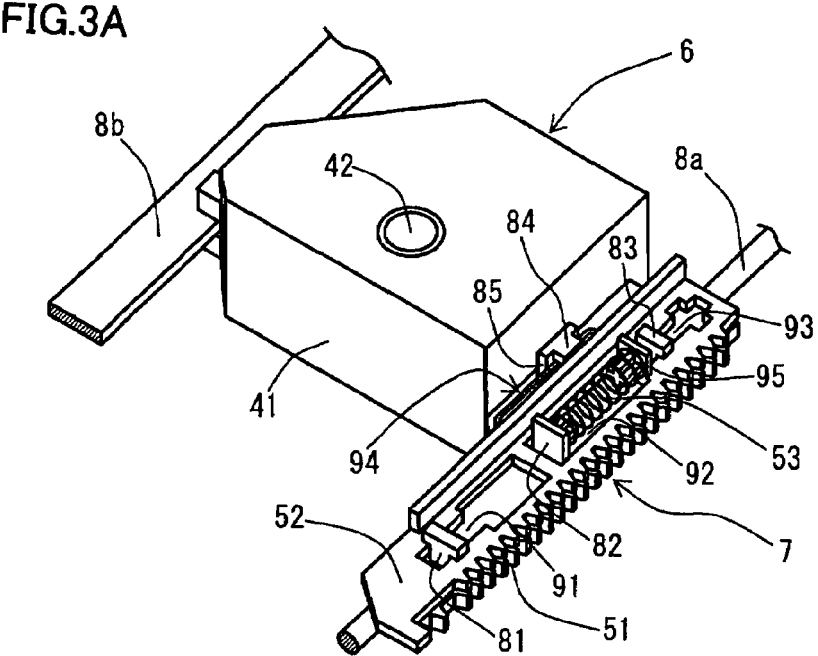
FIG. 3A is a perspective view illustrating a composition of a rack in the optical disk player described in FIG. 1.
Figure 3B:
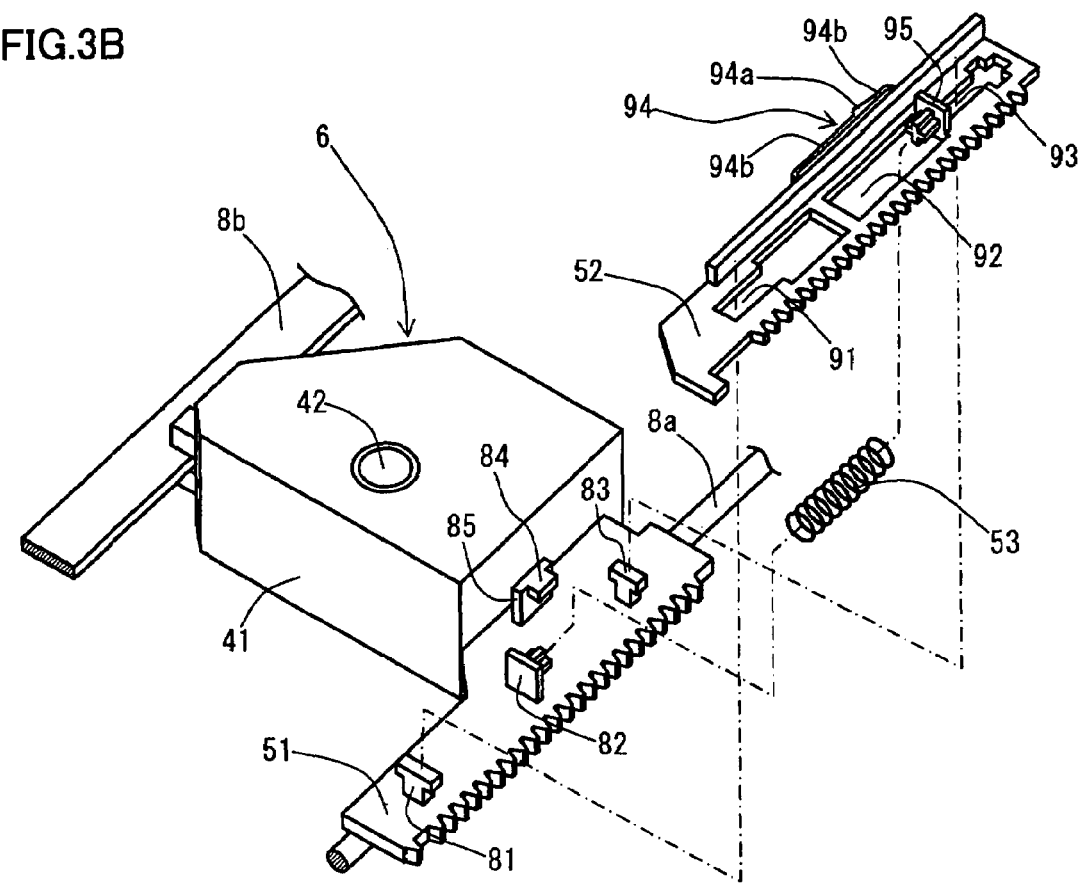
FIG. 3B is an exploded perspective view illustrating the composition of the rack in the optical disk player described in FIG. 1.
Figure 4A:
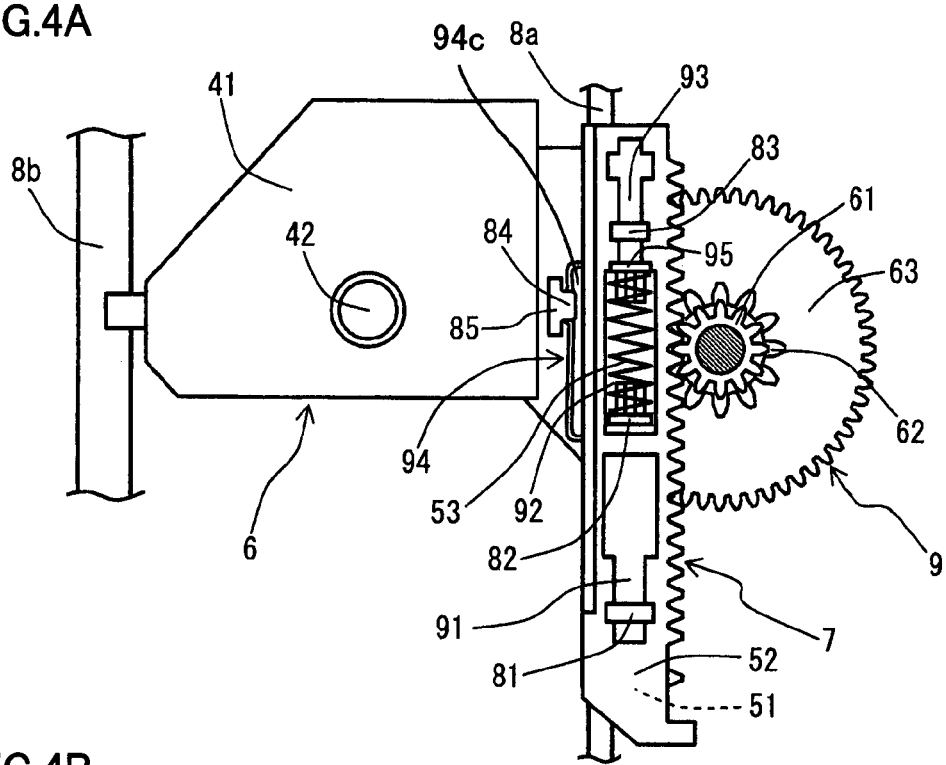
FIG. 4A is a plane view illustrating the composition of the rack in the optical disk player described in FIG. 1.
Figure 4B:
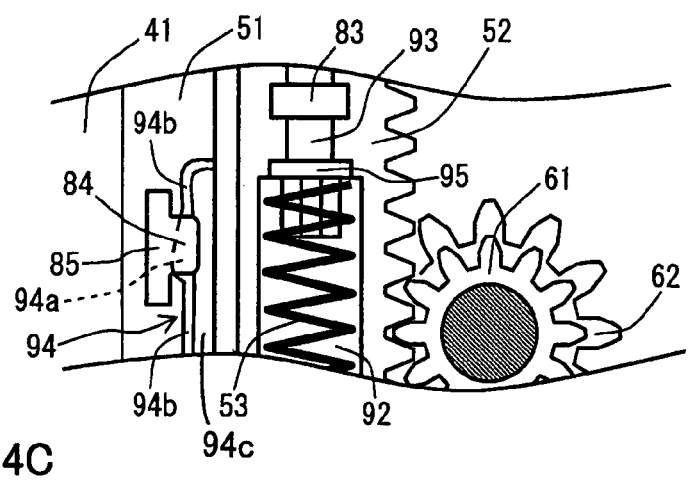
FIG. 4B is an enlarged plane view of a main portion of the rack in the optical disk player described in FIG. 1.
Figure 4C:
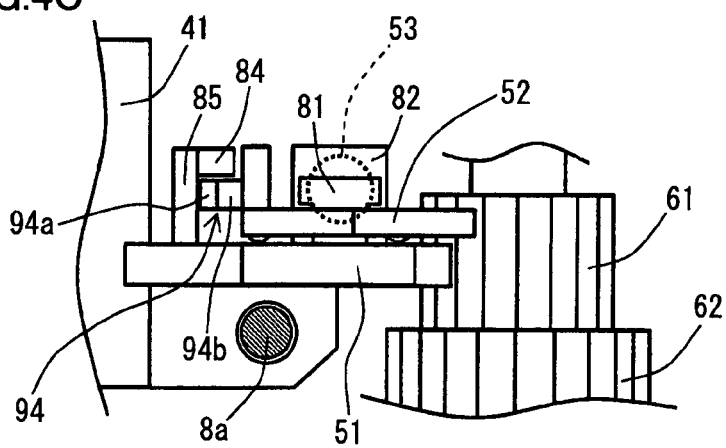
FIG. 4C is an enlarged side view of the main portion of the rack in the optical disk player described in FIG. 1.
Figure 5A:
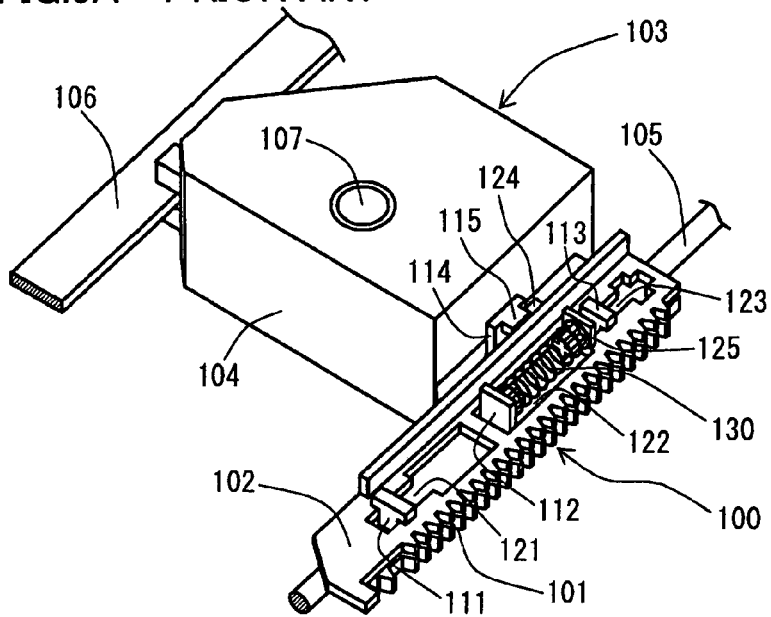
FIG. 5A is a perspective view illustrating a composition of a conventional rack.
Figure 5B:
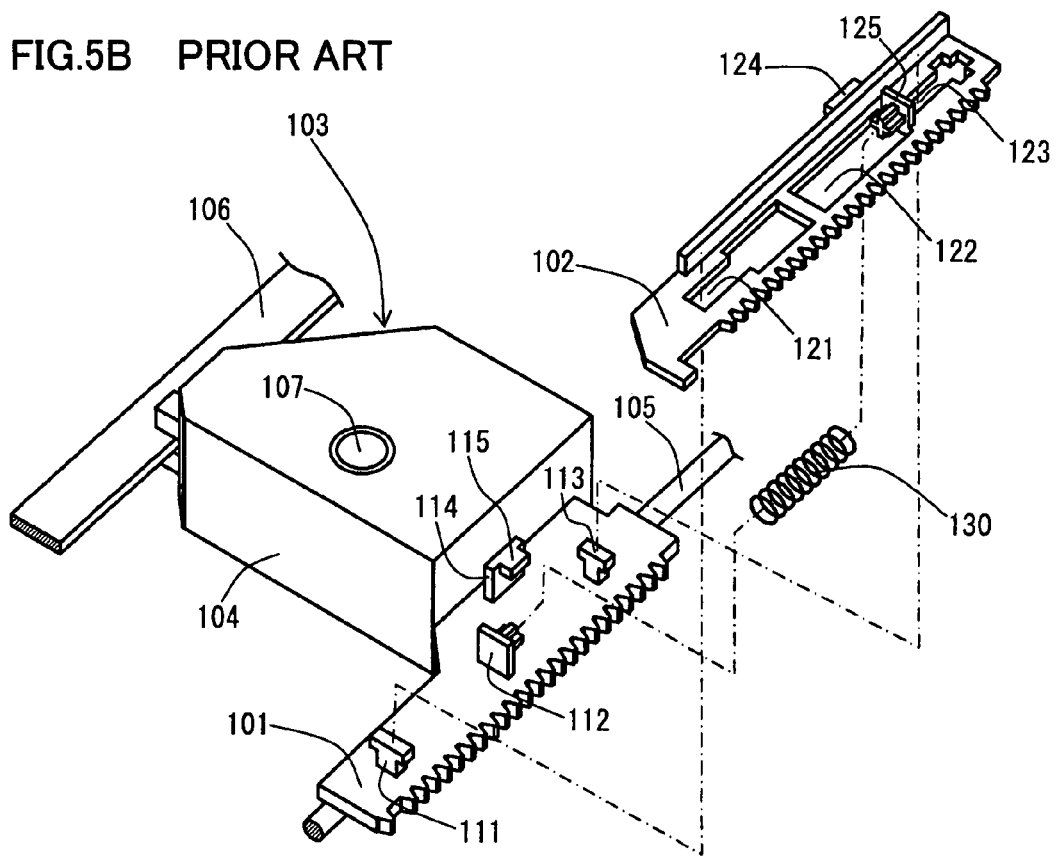
FIG. 5B is an exploded perspective view illustrating the composition of the conventional rack described in FIG. 5A.
Figure 6A:
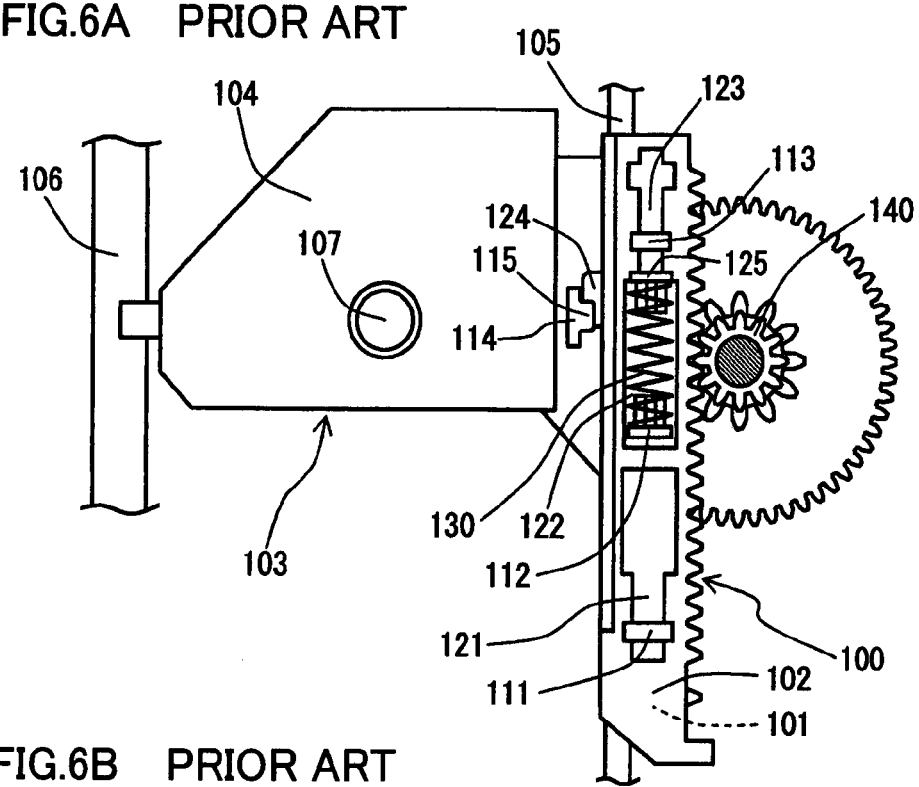
FIG. 6A is a plane view illustrating the composition of the conventional rack described in FIG. 5A.
Figure 6B:
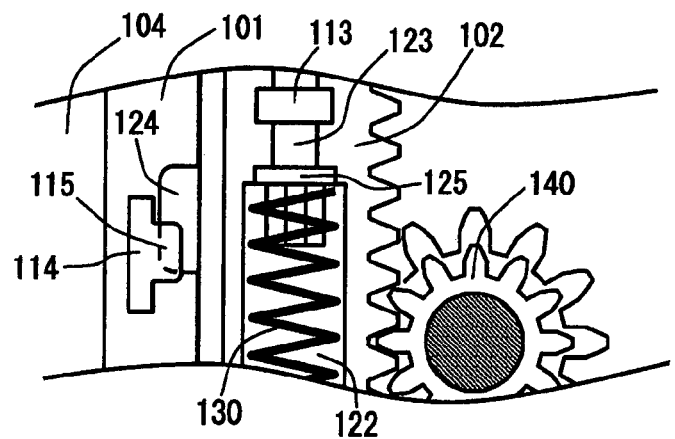
FIG. 6B is an enlarged plane view of a main portion of the conventional rack.
Figure 6C:
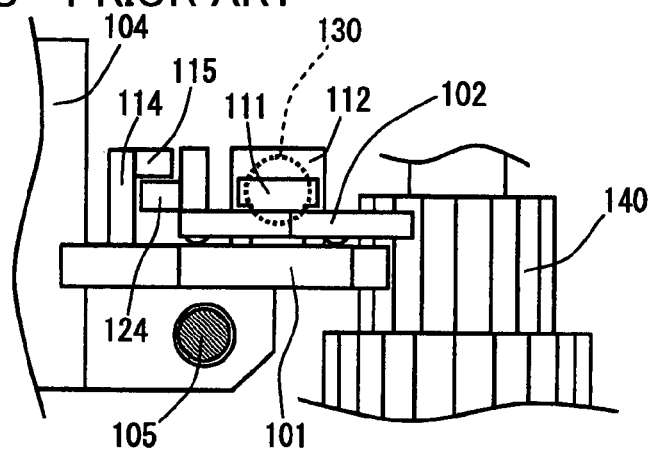
FIG. 6C is an enlarged side view of the main portion of the conventional rack.

FIG. 1 and FIGS. 2A and 2B show a composition of an optical disk player 1 according to an embodiment of the present invention. The optical disk player 1 records and reproduces data in an optical disk 1a such as CD, DVD, and so on.

The optical disk player 1 comprises a disk tray 2 which carries the optical disk 1a, a disk drive unit 3 which rotates the optical disk 1a, a clamper 4 which fixes the optical disk 1a to the disk drive unit 3, and an optical pickup unit 6 which outputs a light to record and read the data in the optical disk 1a. The optical disk player 1 further comprises a rack 7 which holds the optical pickup unit 6, a guide bar 8a and a guide rail 8b which are guide members to support the rack 7 movably, a gear 9 which moves the rack 7, a chassis 10 which supports the above components in the optical disk player.

The disk tray 2 includes a disk attaching portion 21 to which the optical disk 1a is attached, and an opening 22 is provided in the disk attaching portion 21. The disk tray 2 is supported by the chassis 10 slidably and is put in and pulled out from the chassis 10 by a tray drive means, which comprises a motor, a gear, and so on (not shown), for sliding the disk tray 2. When the disk tray 2 is put in the chassis 10, the optical disk 1a based on the disk attaching portion 21 is carried to a position over the disk drive unit 3.

The disk drive unit 3 includes a turn table 31 and a spindle motor 32 to rotate the optical disk 1a, and so on, and is supported by the chassis 10 so that it can move up and down. The turn table 31, which is composed of a magnetic material, is fixedly connected to a rotation axis of the spindle motor 32, and is rotatably driven by the spindle motor 32. The disk drive unit 3 is moved up and down by a lifting and lowering means (not shown), which comprises a motor, a gear, and so on, through the opening 22 in the disk tray 2.

The clamper 4 is supported by a clamp holder 11 so that it can rotate and move up and down in a position over the turn table 31. A magnet 5, whose magnetic force attracts the clamper 4 to the turn table 31, is attached to the clamper 4. The clamp holder 11 is mounted on the chassis 10 so as to be integral with the chassis 10.

When the disk drive unit 3 moves up through the opening 22 in the disk tray 2, the optical disk 1a, which is on the disk tray 2, is pushed up by the turn table 31 and also, the clamper 4 is pushed up by the optical disk 1a. At this time, the magnetic force between the turn table 31 and the magnet 5, which is attached to the clamper 4, attracts the clamper 4 to the turn table 31, thus the optical disk 1a is chucked on the turn table 31 so as to be able to rotate with the turn table 31 and the clamper 4.

The disk drive unit 3 rotates the optical disk 1a together with the turn table 31 and the clamper 4 by rotating the spindle motor 32 with chucking the optical disk 1a as described above.

The optical pickup unit 6 includes a light emitting device and a light receiving device (both are not shown), and then outputs a light, which is emitted from the light emitting device, upward from a light hole 42, which is provided in the case 41 so that the light goes through the opening 22 in the disk tray 2, and also receives the light entering from the light hole 42 by the light receiving device. The optical pickup unit 6 is held by the rack 7.

The rack 7 is a double rack having two rack plates, that is, a fixed rack plate 51 and a movable rack plate 52, overlapping each other, and is movably supported by guide members, that is, a guide bar 8a and a guide rail 8b, and then holds the optical pickup unit 6. The guide bar 8a and the guide rail 8b are fixed to the chassis 10. The optical pickup unit 6 moves in a radial direction of the optical disk 1a (performs a seek operation)

according to a movement of the rack 7 moving along the guide bar 8a and the guide rail 8b. A detailed composition of the rack 7 is described below.

The gear 9 has three gears, wherein a pinion 61 on an upper stage, a small gear 62 on a middle stage, and a large gear 63 on a lower stage are integrally formed, and is supported rotatably by the chassis 10. The fixed rack plate 51 and the movable rack plate 52 of the rack 7 are engaged with the pinion 61 on the upper stage, and a drive gear rotated by a driving force of a motor (not shown) is engaged with the large gear 63 on the lower stage. In other words, the gear 9 is rotated by the driving force of the motor, and the rack 7 is moved by the gear 9 (the pinion 61) rotated by the driving force of the motor. A gear to transmit the driving force to the tray drive means, which puts in and pulls out the disk tray 2, and the lifting and lowering means, which moves the disk drive unit 3 up and down, (not shown) is engaged with the small gear 62 on the middle stage.

The optical disk player 1 having such a composition records and reproduces data on and from the optical disk 1a by outputting the light from the optical pickup unit 6 with the optical disk 1a rotated by the disk drive unit 3, and at that time, the optical disk player 1 makes the optical pickup unit 6 carry out the seek operation by moving the rack 7 according to the rotation of the gear 9 by the driving force of the motor.

FIGS. 3A, 3B, 4A, 4B, and 4C show a composition of the rack 7. As described above, the rack 7 comprises the fixed rack plate 51 and the movable rack plate 52. The fixed rack plate 51 is made of a resin to be integral with the case 41 of the optical pickup unit 6 (in other words, to be integral with the optical pickup unit 6) and is supported by the guide bar 8a and the guide rail 8b to be movable in a tooth row direction of the fixed rack plate 51. The movable rack plate 52 is attached to overlap the fixed rack plate 51 so that it can slide in a moving direction of the fixed rack plate 51 (in other words, a direction parallel to the guide bar 8a and the guide rail 8b) through a spring 53.

On the fixed rack plate 51, projecting members 81, 82, and 83, which attach slidably the movable rack plate 52, and a locking portion 84, which locks the movable rack plate 52 not to be detached from the fixed rack plate 51, are provided. The projecting member 82 also holds the spring 53. The projecting members 81, 82, and 83 are disposed on an upper surface of the fixed rack plate 51, and form a line in the moving direction of the fixed rack plate 51. The locking portion 84 is formed by extending a supporter 85 laterally, which projects from the upper surface of the fixed rack plate 51, and projects from a side surface of the supporter 85.

On the movable rack plate 52, guide slots 91, 92, and 93 for attaching slidably the movable rack plate 52 to the fixed rack plate 51, a projecting portion 94 for preventing the movable rack plate 52 from being detached from the fixed rack plate 51, and a projecting member 95 for holding the spring 53, are provided. The guide slots 91, 92, and 93 are disposed along a tooth row direction of the movable rack plate 52 and have openings, respectively. The projecting member 95 projects from the upper surface of the movable rack plate 52.

The projecting members 81, 82, and 83 on the fixed rack plate 51 are slidably inserted into the guide slots 91, 92, and 93, so that the movable rack plate 52 is attached to the fixed rack plate 51 so as to be able to slide in the moving direction of the fixed rack plate 51. The locking portion 84, which is disposed above the projecting portion 94 on the movable rack plate 52, locks slidably the projecting portion 94, so that the movable rack plate 52 is held not to be detached from the fixed rack plate 51.

The spring 53 is disposed between the projecting member 82 on the fixed rack plate 51 and the projecting member 95 on the movable rack plate 52 in compression state. Consequently, in the rack 7, stretching force of the spring 53 allows teeth of the fixed rack plate 51 and teeth of the movable rack plate 52 to hold teeth of the pinion 61 tightly, thus the backlash between the rack 7 and the pinion 61 is prevented, and the feed accuracy of the optical pickup unit 6 is improved.

The projecting portion 94, which is made of a resin spring, on the movable rack plate 52 presses elastically the side surface of the supporter 85 on the fixed rack plate 51, and presses inner side surfaces of the guide slots 91, 92, and 93 against the projecting members 81, 82, and 83 by using a repulsive force of the projecting portion 94 caused by pressing the side surface of the supporter 85. In other words, the projecting portion 94 on the movable rack plate 52 also functions as a press member which presses the movable rack plate 52 against the fixed rack plate 51 in a horizontal direction perpendicular to a slide direction of the movable rack plate 52 (the moving direction of the rack 7).

In the projecting portion 94 (the press member), a press portion 94a for pressing the supporter 85 is disposed in a middle position of a flexibly deformable portion 94b made of a resin spring whose both ends are fixedly connected to the movable rack plate 52. A space 94c is provided between the projecting portion 94 and a body of the movable rack plate 52. The flexibly deformable portion 94b extends parallel to the slide direction of the movable rack plate 52 and is flexibly deformable in the horizontal direction perpendicular to the slide direction of the movable rack plate 52. The projecting portion 94 is made of a resin to be integral with the movable rack plate 52.

The press portion 94a in the projecting portion 94 contacts directly the supporter 85 on the fixed rack plate 51 with the flexibly deformable portion 94b bending, and presses the supporter 85 by using an elastic force of the flexibly deformable portion 94b. Consequently, in the rack 7, the movable rack plate 52 is pressured in a direction away from the supporter 85 (toward the side of the pinion 61) by the repulsive force of the projecting portion 94. Thus, the inner surfaces of the guide slots 91, 92, and 93 in the movable rack plate 52 are pressed against the projecting members 81, 82, and 83, and a shaky movement between the movable rack plate 52 and the fixed rack plate 51 in the horizontal direction is avoided.

According to the optical disk player 1 having the composition described above, the inner surfaces of the guide slots 91, 92, and 93 in the movable rack plate 52 are pressed against the projecting members 81, 82, and 83 on the fixed rack plate 51 by the projecting portion (the press member) 94. Thus the shaky movement between the movable rack plate 52 and the fixed rack plate 51 in the horizontal direction is avoided. Consequently, the optical disk player 1 can prevent the movable rack plate 52 from hitting the fixed rack plate 51 when the rack 7 moves with rotation of the pinion 61, and thus can reduce a sound caused by the movable rack plate 52 hitting the fixed rack plate 51 (referred to as a clatter, hereinafter), thereby suppressing a noise of the clatter.

Moreover, the projecting portion 94, which locks the movable rack plate 52 not to be detached from the fixed rack plate 51, also functions as the press member, and the shaky movement between the movable rack plate 52 and the fixed rack plate 51 in the horizontal direction is avoided by using the composition not to detach the movable rack plate 52 from the fixed rack plate 51, so that the composition of the rack 7 does not get complex but can be simplified and downsized. Furthermore, the projecting portion 94 is composed of the resin spring which is made of the resin to be integral with the movable rack plate 52, thus the composition to avoid the shaky movement between the movable rack plate 52 and the fixed rack plate 51 can be simply and inexpensively achieved.

The present invention is not limited to the composition described above, however, various modifications are applicable. For example, the press member is not limited to the composition to be integral with the projecting portion 94, which locks the movable rack plate 52 not to be detached from the fixed rack plate 51, but can be disposed separately from the projecting portion 94, and can also be disposed on the fixed rack plate 51. Moreover, the press member is not limited to the resin spring, however, any structure or material is applicable, as long as the movable rack plate 52 is pressed against the fixed rack plate 51 in the horizontal direction. Furthermore, the fixed rack plate 51 can be separated from the case 41 of the optical pickup unit 6.

This application is based on Japanese patent application filed Mar. 29, 2006, the contents of which are hereby incorporated by reference.

What is claimed is:

1. An optical disk player, comprising:
    an optical pickup unit which outputs a light to record and read data on and from an optical disk;
    a pinion which is rotated by a driving force of a motor; and
    a rack which holds the optical pickup unit and is also engaged with the pinion and moved with rotation of the pinion, wherein
    the rack is a double rack which includes a fixed rack plate, which is movably supported by guide members and is fixed to the optical pickup unit, and a movable rack plate, which overlaps the fixed rack plate slidably in a direction parallel to a moving direction of the fixed rack plate so that a backlash between the rack and the pinion is prevented, wherein
    the optical disk player further comprises a press member which presses the movable rack plate against the fixed rack plate in a horizontal direction perpendicular to a slide direction of the movable rack plate, wherein
    a shaky movement between the movable rack plate and the fixed rack plate in the horizontal direction is avoided by pressing the movable rack plate against the fixed rack plate by using the press member, and thus the movable rack plate does not hit the fixed rack plate when the rack moves with rotation of the pinion.

2. The optical disk player according to claim 1, wherein
    a locking portion, which is formed by extending a supporter on an upper surface of the fixed rack plate, is provided on the fixed rack plate to lock the movable rack plate not to be detached from the fixed rack plate,
    a projecting portion, which projects from a side surface of the movable rack plate and is slidably locked by the locking portion, is provided on the movable rack plate,
    the projecting portion also functions as the press member, and
    the press member presses the movable rack plate against the fixed rack plate by using a repulsive force caused by pressing the supporter.

3. The optical disk player according to claim 2, wherein
    the press member has a resin spring made of a resin to be integral with the movable rack plate.

4. The optical disk player according to claim 3, wherein
    projecting members, which project from an upper surface of the fixed rack plate, are provided on the fixed rack plate so that the movable rack plate is slidably attached to the fixed rack plate, and
    guide slots, into which the projecting members are slidably inserted, are provided on the movable rack plate.

5. The optical disk player according to claim 2, wherein
    projecting members, which project from an upper surface of the fixed rack plate, are provided on the fixed rack plate so that the movable rack plate is slidably attached to the fixed rack plate, and
    guide slots, into which the projecting members are slidably inserted, are provided on the movable rack plate.

6. The optical disk player according to claim 1, wherein
    the press member has a resin spring which is made of a resin to be integral with the movable rack plate.

* * * * *